April 15, 1947. R. S. WEHNER 2,418,961
BROAD BAND ANTENNA FOR AIRCRAFT
Filed Aug. 1, 1944 5 Sheets-Sheet 1

INVENTOR
ROBERT S. WEHNER
BY
ATTORNEY

April 15, 1947.　　　R. S. WEHNER　　　2,418,961
BROAD BAND ANTENNA FOR AIRCRAFT
Filed Aug. 1, 1944　　　5 Sheets-Sheet 2

INVENTOR
ROBERT S. WEHNER

BY *H. S. Grover*

ATTORNEY

Fig. 4.

INVENTOR
ROBERT S. WEHNER
BY H. S. Grover
ATTORNEY

INVENTOR
ROBERT S. WEHNER

BY H.S.Grover

ATTORNEY

Patented Apr. 15, 1947

2,418,961

UNITED STATES PATENT OFFICE 2,418,961

BROAD BAND ANTENNA FOR AIRCRAFT

Robert Stephen Wehner, Port Jefferson, N. Y., assignor to Radio Corporation of America, a corporation of Delaware Application August 1, 1944, Serial No. 547,549

19 Claims. (Cl. 250—33)

The present invention relates to broad-band antennas and, more particularly, to such antennas which are suitable for use on aircraft.

An object of the present invention is the provision of an aircraft antenna adapted to radiate vertically polarized radio waves.

A further object of the present invention is the provision of an antenna as aforesaid which is small in size.

A further object of the present invention is the provision of an antenna as aforesaid in which the vertical height, or maximum extension from the skin of the airplane is of the order of, or less than, one-eighth of the resonant wavelength.

A further object of the present invention is the provision of an antenna suitable for use on aircraft which has impedance characteristics such as to permit its being matched to a 50-ohm line with less than a 2:1 standing wave ratio over frequency bands 30 or more per cent in width.

A further object of the present invention is the provision of an aircraft antenna providing a more nearly hemispherically symmetrical field pattern than is furnished by heretofore known antennae.

Still another object of the present invention is the provision of an aircraft antenna which is mechanically strong and aerodynamically sound.

A further object of the present invention is the provision of an aircraft antenna which may readily be made semi-retractible, and which is conveniently energized from a conventional coaxial transmission line.

The foregoing objects and others which may appear from the following detailed description are attained in accordance with the principles of the present invention by providing an antenna in the form of an inverted-L having the vertically extending portion of the antenna constituted by a coaxial sleeve surrounding the vertical portion of an extension of the inner conductor of a coaxial transmission line by means of which the antenna is energized. Furthermore, the horizontal portion of the inverted-L is constituted by a length of ordinary aircraft antenna wire having a small diameter so that the ratio of the diameters of the horizontal to the vertical portion of the antenna is of the order of 0.27 to 0.10. Since such a small diameter horizontal radiating portion is not self-supporting, the present invention further contemplates the provision of a suitable supporting means for maintaining the horizontal portion in its desired position.

The present invention will be more fully understood by reference to the following detailed description which is accompanied by a drawing in which Figure 1 illustrates in elevation, for the purpose of comparison, an inverted-L type of antenna at present known in the art, while Figure 2 is a diagram illustrating the directivity pattern of the present invention compared to that of a straight stub antenna. Figure 3 illustrates an application of the principles of the present invention to the antenna of Figure 1, while Figure 5 illustrates diagrammatically another embodiment of the present invention, and Figure 5a is a curve illustrating the relation between radiation resistance and the ratio of diameter of the vertical and horizontal portions of the antenna of Figure 5. Figure 6 illustrates a further modification of the present invention, while Figure 11 illustrates in elevation and partly in section a modification of the present invention utilizing both series and shunt impedance matching sections, while

Figure 1:
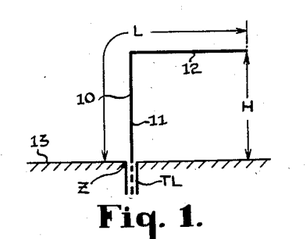

Referring now to Figure 1, there is illustrated an antenna 10 in the form of an inverted-L having a vertical portion 11 and a horizontal portion 12. The antenna is mounted over a conducting sheet 13 constituting an electrically effective ground plane. The antenna is energized at the lower end of vertical portion 11 by means of a coaxial transmission line TL. The inner conductor of the transmission line TL is directly connected to the vertical portion 11 of antenna 10, while the outer shell of the coaxial transmission line TL is electrically connected to the ground plane 13.

Figures 2, 11:
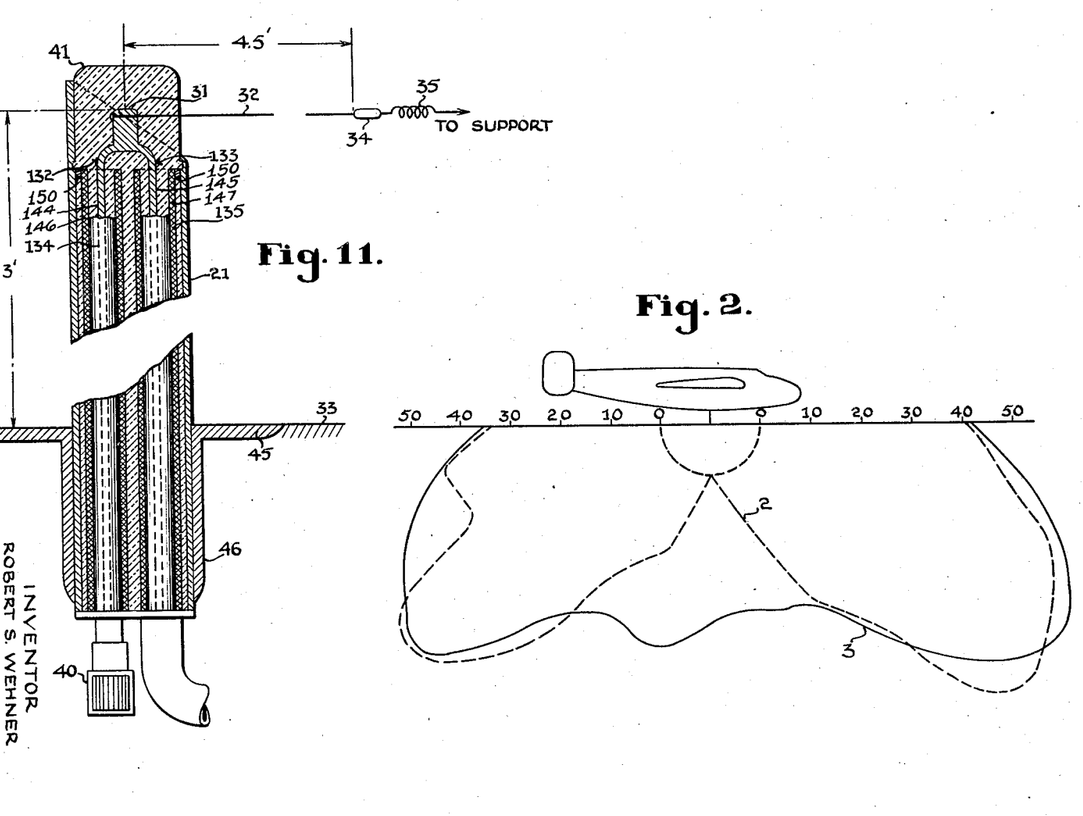

Figure 2 illustrates the directivity patterns in the fore and aft vertical plane of an airplane having a stub antenna and an inverted-L antenna of the present invention mounted underneath the fuselage at the intersection of the center lines of the wing and fuselage of the plane. The plane is shown at 1 with the location of the antennas placed at the center of a polar diagram. The field strength distribution obtained from a stub antenna is indicated by dotted line 2 and the field strength distribution obtained by the inverted-L antenna is indicated by solid line 3.

While the pattern of an aircraft antenna is dependent to some extent upon not only the nature of the antenna itself, but the size and shape of the skin of the ship, the operating frequency, the presence of turrets, guns, other antennas, etc., and is usually anything but symmetrical, it will be seen that the pattern (illustrated by line 3) due to an antenna of the inverted-L type, that is an antenna having both vertical and horizontal currents, is more symmetrical than that shown by curve 2 due to a conventional stub antenna. This is due to the fact that radiation from the current in the horizontal member of the L antenna tends to fill in, partially at least, the nulls in the distribution of radiation from the vertical current. It will be noted that instead of a null directly downward, as is the case with the stub, the inverted-L gives almost half as much field strength downward as it does in the large fore and aft lobes.

As far as pattern is concerned, the principal advantage of antennas embodying features of the present invention over conventional antennas is that they are more nearly symmetric than the latter, particularly in that they give strong radiation off their ends, where the conventional stub yields a null. This feature is valuable in certain military applications and possibly in future peacetime applications.

Figure 1A:
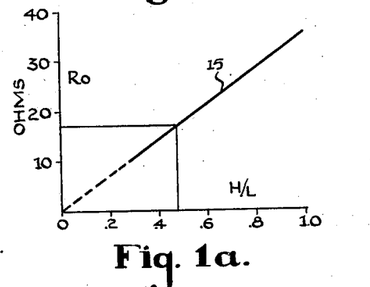
Figure 1a is a curve illustrating the relation of the radiation resistance to the ratio of height over length of the antenna in Figure 1.

In Figure 1a, curve 15 illustrates the relationship in the antenna of Figure 1 between values of radiation resistance at resonance, $R_0$ as ordinates, plotted against ratios of height H to length L of the antennas of Figure 1, as abscissae. Since the effect of bending the antenna is to reduce the input impedance at resonance in direct proportion to the reduction in height, the impedance of such antennas is too low to permit their being matched to standard transmission lines of frequency bands of appreciable width. For example, it will be noted from Figure 1a that an inverted-L antenna of a height H equal to one-half of its total length L has a resonant resistance of only 18 ohms, much too low for effective wide-band matching to a 50-ohm line.

Figure 3:
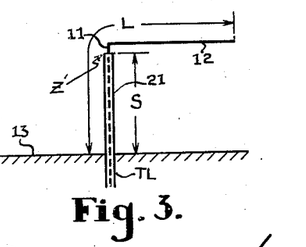
Figure 3A:
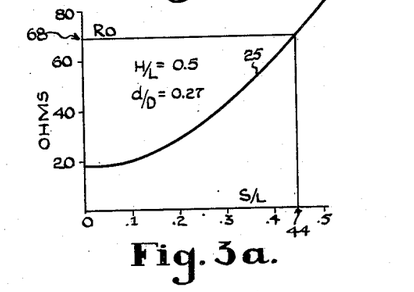
Figure 3a is a curve illustrating the relationship between the radiation resistance and the ratio of vertical height to length of the antenna of Figure 3.

Now if the antenna of Figure 1 is modified according to the principles of the present invention, in the manner illustrated in Figure 3 wherein the vertical portion 11 of the antenna is surrounded by a coaxial sleeve 21, the input impedance may be greatly increased. A purpose of the sleeve 21 is to shift the feed point of the antenna from a region of high current and low resistance as indicated by point Z of Figure 1 to a region of low current and proportionately higher resistance as indicated by point Z' of Figure 3. The outer surrounding sleeve 21 of the antenna of Figure 3 may conveniently be constituted by an extension of the outer sheath of coaxial transmission line TL. The effect of increasing sleeve length on the resonant resistance of an inverted-L antenna of a ratio of height to overall length equal to .5 is shown in Figure 3a. For example, by means of a sleeve having a length S equal to 0.44L, the resonant impedance of the antenna of Figure 3 is increased to 68 ohms over the 18 ohms value for the antenna of Figure 1. This is shown by curve 25 of Figure 3a. Here the values of resonant impedance $R_0$ of the antenna are plotted as ordinates against the ratio of sleeve height to over-all antenna length as abscissae. Though the steepness of the reactance curve is not increased by the presence of the sleeve, it is obvious that this antenna has a much greater intrinsic bandwidth than the simple inverted-L.

The intrinsic band-width of an antenna may be increased by raising its impedance lever and/or by reducing the steepness of its reactance curve. The primary purpose of the sleeve is to raise the impedance level, but if it did this at the expense of an increased variation of input reactance with frequency its effectiveness in broad-banding the antenna would be limited. The sleeve actually causes a slight flattening of the reactance curve, and so operates in a twofold manner to increase band-width, although this effect is much less important than the increased impedance level.

The impedance characteristics of an antenna may be described in terms of three factors: namely, the value of its input resistance, the rate of change of resistance with frequency, and the rate of change of reactance with frequency. For series-resonant antennas the resistance is a much more slowly varying function of frequency than is the reactance; consequently the two important factors affecting the band-width obtainable with a given antenna are:

(1) the resonant resistance, called the impedance level and (2) the rate of change of reactance with frequency, called the steepness of the reactance curve.

Other things being equal, a high-impedance-level antenna can be matched to a transmission line, by means of a simple series matching section, over a much wider range of frequencies than can an antenna of low impedance. In other words, greater band-width can be obtained by means of a series line matching section if that section is used to transform the antenna impedance down to the level of the impedance of the feed line than if the section must be used to transform the antenna impedance up to that of the line. This fact may be shown mathematically by taking the conventional equation for the input impedance of a loss-less terminated transmission line and differentiating both sides with respect to frequency. The resulting expression for rate of change of input impedance with frequency is extremely complicated in form and difficult to evaluate, but even so it is evident that it depends inversely upon the absolute value of the terminating impedance, being smaller when the terminating impedance is higher than the surge impedance of the line. This effect is much more easily seen graphically, rather than analytically, by referring to a standard transmission line chart. Consider, for example, the rectangular form of chart shown in Figure 4 in which a coordinate system of two orthogonal families of circles, corresponding to constant standing wave ratio and to constant electrical length, respectively, is superposed upon a rectangular coordinate system in which relative reactances as ordinates are plotted against relative resistance as abscissae. It is clearly evident on these charts that a given change in electrical length (i. e., a given change in frequency) corresponds to a much smaller change in impedance on the low-resistance (left-hand) side of the chart than on the high-resistance (right-hand) side.

As an illustration of this principle consider the case of a typical low-impedance antenna, the simple inverted-L shown in Figure 1. Suppose it is desired to match this antenna to 50 ohms at its resonant frequency. Since the resonant resistance is 17.5 ohms as indicated by point $Z_{A1}$ on the chart (Figure 4) a quarter-wave matching section of impedance 29.6 ohms is called for. The solid line 5 represents the impedance of the inverted-L in terms of the surge impedance, 29.6 ohms, of the matching section, each point on the line 5 being labelled with its ratio of frequency to resonant frequency. The dashed line 6 represents the matched impedance, that is the impedance looking from a transmission line of 50 ohms impedance into the matching section terminated by the antenna. The dashed line 6 shows that while the resonant impedance is exactly matched to 50 ohms (1.69×29.6=50), the impedances at other frequencies are nowhere near matched; in fact, the "matched" impedance is spread out almost as much as the original antenna impedance.

Figure 4:
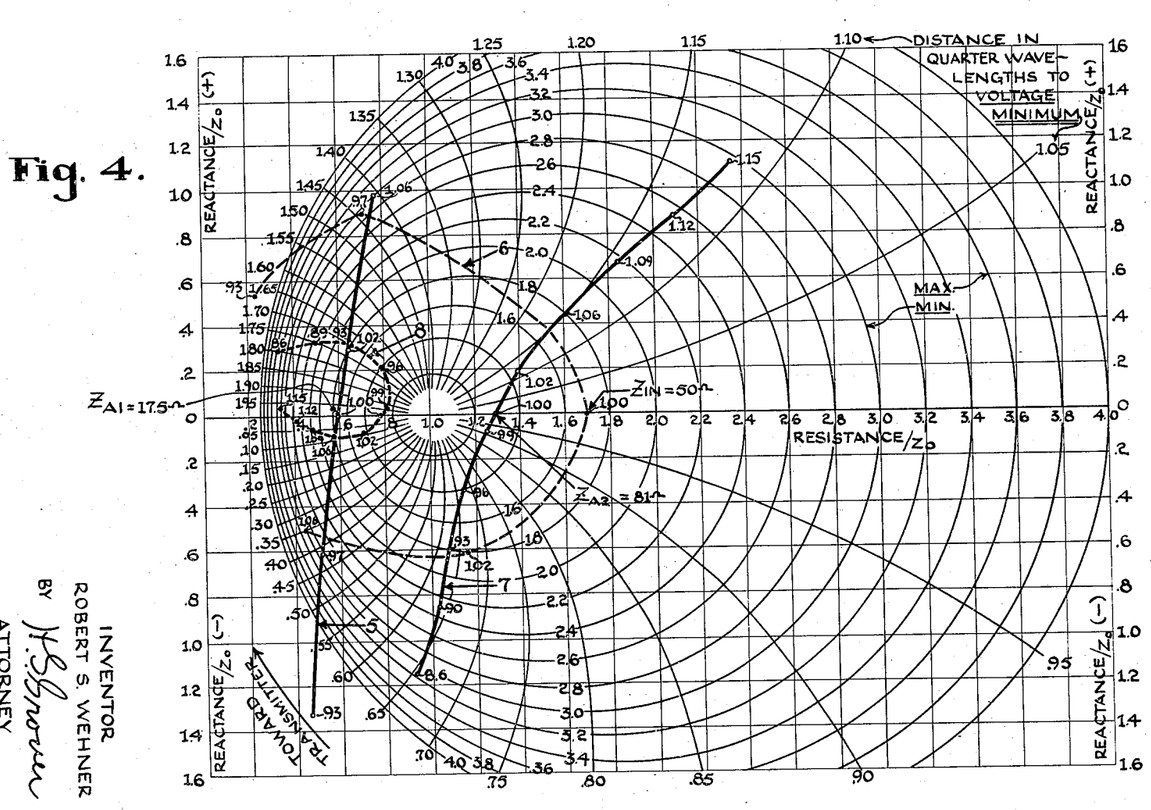
Figure 4 is a transmission line chart comparing broad band operation of the antenna of Figure 1 with that of Figure 3.

Now consider a high-impedance antenna, for example the broad-band inverted-L of Figure 3. Again let us suppose that the antenna is to be matched to 50 ohms at its resonant frequency. Since the resonant resistance is 81 ohms as indicated by point $Z_{A2}$ the impedance of the quarter-wave matching section will be 63.8 ohms. The solid line 7 represents the antenna impedance in terms of the matching impedance $Z_0$ of 63.8 ohms, while the dashed line 8 represents the matched impedance looking from the transmission line also in terms of its ratio to the matching section impedance, 63.8 ohms. It will be noted that in this case the values of the transformed or matched impedance are closely clustered around the resonant frequency impedance which is, as before, exactly matched to 50 ohms.

While both antennas are exactly matched to 50 ohms at resonance, the matched impedance-frequency characteristic of the high-impedance antenna is much flatter than that of the low impedance antenna. The matched impedance of the high-resistance antenna lies within a 2:1 standing wave ratio over a range of relative frequencies extending from 0.90 to 1.12, a band-width of about 22 per cent. The matched impedance of the low-resistance antenna lies within a 2:1 standing wave ratio over a range of relative frequencies extending only from 0.98 to 1.025, a band-width of only 4.5 per cent.

It is to be understood that the above examples are for the purposes of illustration only; the design of series matching sections has been greatly over-simplified in order to emphasize the importance of impedance level upon band-width.

It is not to be presumed that the higher the impedance level the better, since an antenna having a resonant resistance very much higher than the characteristic impedance of the line to which it is to be matched is just as undesirable as one whose resistance is too low. Depending upon the characteristic impedance of the line and upon the standard of matching there is an optimum impedance level which may be roughly given as equal to the product of the characteristic impedance and the maximum allowable standing wave ratio. For example, in matching to a 50 ohm line with less than a 2:1 standing wave ratio, optimum band-width can be obtained with an antenna having a resonant resistance of approximately 50×2 or 100 ohms, other things being equal, of course.

For a given impedance level greater band-width can be obtained with an antenna whose rate of variation of reactance with frequency is low, than with one whose reactance curve is steep. The truth of this statement is evident at a glance at any transmission line chart, and indeed is almost axiomatic: broad-band antennas are "flat" antennas.

Figures 5, 5A, 6:
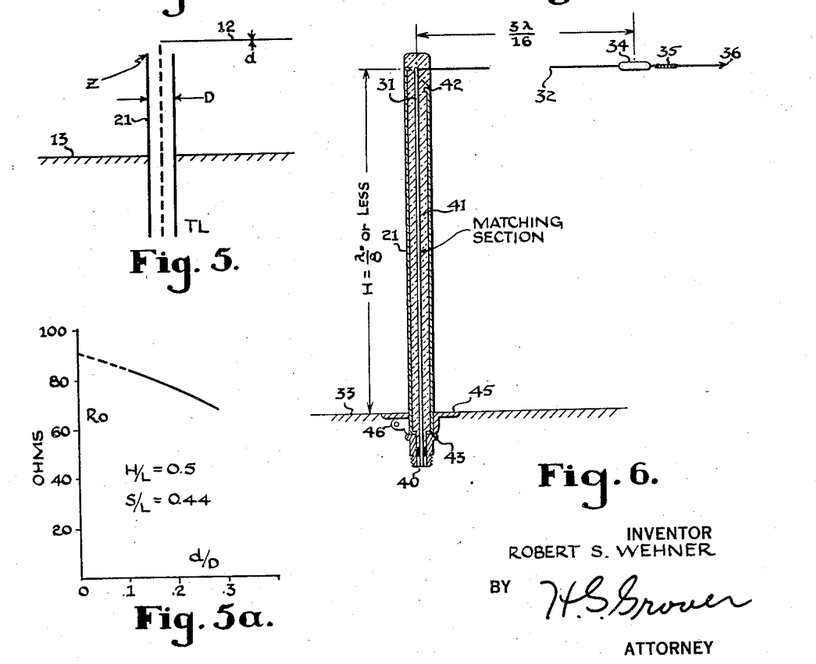

The antenna of Figure 3 which is described above, while having broad-band characteristics may not in all cases be a preferred embodiment because of the problem of supporting the horizontal portion of the antenna against the extreme stresses caused by the air stream flowing along the surfaces of modern high speed aircraft. However, it has been found that the resistance of the inverted-L antenna with the sleeve increases with a decrease in the ratio of diameter of the horizontal radiator 12 to that of the vertical sleeve 21. This is shown in Figure 5a. Therefore, as shown in Figure 5, the diameter $d$ of horizontal portion 12 may be reduced to one tenth or less of the diameter $D$ of sleeve 21. This increases the resonant resistance of the antenna from 68 to 82 ohms. Consequently, the above-mentioned mechanical difficulty may be overcome, and the intrinsic band-width of the antenna further increased, simply by replacing the horizontal portion of the quarter-wave mast of Figure 3 by a length of ordinary aircraft antenna wire and providing suitable tensioning means for the horizontal portion. The diameter ratio chosen for a particular application depends upon the impedance step up required. A decrease in the relative diameter of the horizontal portion of the antenna with respect to the vertical portion effects an increase in input resistance for two reasons:

(1) The smaller the wire, relative to the sleeve, the smaller the current in the wire compared to that on the surface of the sleeve; that is, the smaller the wire the greater the shift of the feed point toward a region of lower current and correspondingly higher input resistance.

(2) The smaller the wire, in an absolute sense, the less the capacity between the wire and ground and the less the reduction in input resistance due to this capacity, which may be considered (in a loose lumped-impedance theory) as in parallel the radiation resistance of the antenna.

Since the effect of the bending, the effect of the sleeve, and the effect of the small diameter ratio all act to shift resonance toward the higher frequencies, the total length of the improved antenna may be slightly greater than a quarter wave-length at resonance. An antenna with a vertical sleeve having a length of the order of one-eighth wavelength is, therefore, preferably used with a horizontal wire having an overall length of the order of three-sixteenths of a wavelength.

A practical embodiment of the present invention is shown in Figure 6. The sleeve 21 may be constituted, for example, of one-inch stainless steel pipe extending one-eighth wavelength or less from the skin 33 of the fuselage of the aircraft. The horizontal radiator portion 32 may consist of copper-clad steel aircraft antenna wire having a diameter of the order of forty-thousandths of an inch. The horizontal portion runs from the top of the inner conductor 31 of the vertical portion of the antenna out to a strain insulator 34 followed by a tension spring 35 and a guy-wire 36 leading to some convenient means of support. A transmission line formed by sleeve 21 of the inner conductor 31 is made to have a surge impedance and an electrical length such that it acts as a simple series line section matching the impedance of the antenna at the mouth of the sleeve to the 50-ohm transmission line connected at the base of the antenna to the transmission line coupler 40. The sleeve 21 is filled with a low-loss, low-dielectric-constant solid dielectric, such as polythene or "Polectron polymer" 41, in order to give mechanical strength and shorten the physical length of the matching section, to a length of the order of the length required for the one-eighth wave extension of the antenna beyond the conducting sheet 33.

The dielectric may be held in place by spinning the wall of the sleeve 21 into shallow grooves 42 and 43 cut into the dielectric near the ends. The mounting fixture for the antenna may consist of a flanged collar 45, the flange being bolted to either side of the skin 33 of the ship, and the collar being fitted with an adjustable clamp 46, gripping the base of the antenna. It will be noted that this type of mounting permits the vertical portion of the antenna to be easily retracted or extended merely by loosening the clamp 46 and sliding the vertical portion of the antenna through the flange collar 45.

Figure 7:
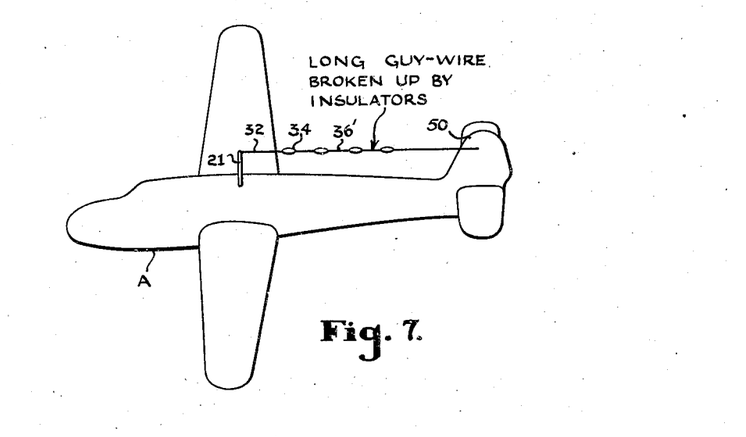
Figures 7, 8, and 9 illustrate several typical ways in which an antenna embodying the present invention may be installed on aircraft.
Figure 8:
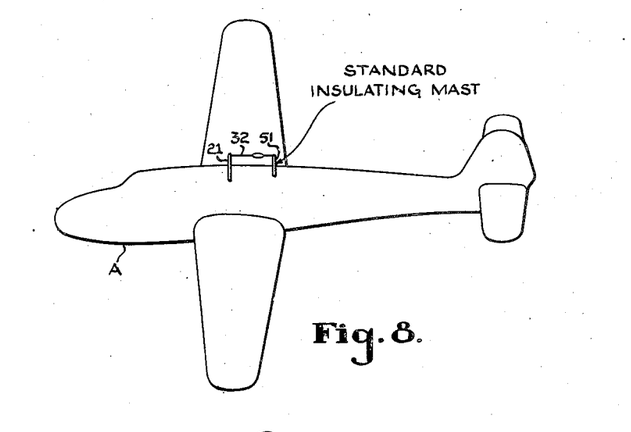
Figure 9:
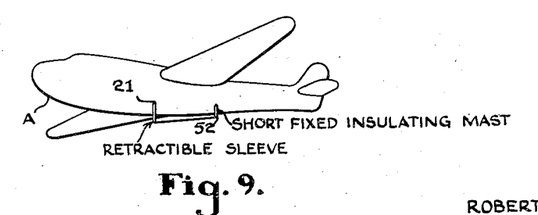

In Figures 7, 8, and 9 I have shown a variety of ways in which the present antenna may be installed on aircraft. In Figure 7 the airplane is indicated by reference character A, while the vertical sleeve portion 21 of the antenna is shown as projecting from a convenient point at the top of the fuselage. The horizontal portion 32 of the antenna is supported by a length of guy-wire 36' suitably broken up by strain insulators 34 to prevent spurious resonances. The end of the guy-wire 36' is attached to the vertical tail structure 50 of the plane. If desired, the antenna may be mounted as shown in Figure 8 wherein the free end of the horizontal portion 32 of the antenna is mounted on a standard insulating mast 51. In this case, of course, the mast 51 may be placed as close as desired to the vertical portion 21 of the antenna and there is no necessity for the long guy-wire 36' of Figure 7. If it is desired to mount the antenna on the bottom of the plane, an arrangement as shown in Figure 9 may be used. The retractible sleeve 21 is here mounted on the bottom of the fuselage midway between the wings, while the free end of the horizontal portion is supported by a short fixed insulating mast 52. In this form of construction, in order to clear the ground in landing the plane, the vertical portion 21 of the antenna should be arranged to be readily retractible and therefore the clamp fitting 46 of Figure 6 should be readily accessible to the pilot or operator of the radio equipment. If necessary, conventional motor driven remote control means may be applied to retract the sleeve portion 21 of the antenna.

While in many cases it may be sufficient to match the broad-band inverted-L to the feed line by means of a simple series transmission line built into the sleeve and forming a direct continuation of the feed line, except for the small disturbance caused by the cable connector, it may in some circumstances be necessary to use more complicated matching sections.

Where unusually wide band coverage is desired with an antenna of low vertical extension a series matching section may be inadequate. Since the lower the horizontal wire the greater the rate of variation of reactance with frequency, it may be necessary to flatten out the reactance characteristic by means of a shunt section before applying the series section.

Figure 10:
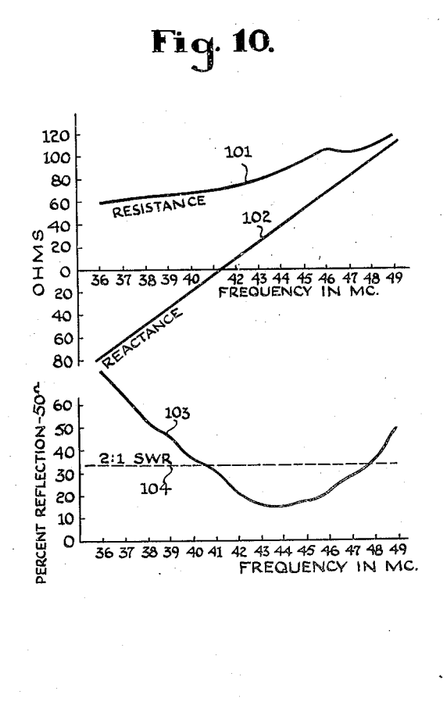
Figure 10 is a group of curves illustrating the effect of change of frequency on an antenna such as shown in Figure 6 but having an extremely small extension from the surface of the ship.

Figure 10 shows the measured impedance and reflection curves of an antenna constructed generally along the lines of Figure 6 but having a vertical extension of 3 feet and a 40 mil horizontal wire 4' 6" long operating over a frequency band of 36 to 49 megacycles.

In this case installation circumstances demanded an unusually low vertical height. Therefore it became necessary to use a smaller horizontal wire than usual in order to obtain a reasonably high input resistance. Sleeve 21 in this case has a diameter of 1⅛ inches. The variation in resistance and reactance is shown by curves 101 and 102 in the upper part of the figure, while curve 103 shows the percentage of reflection over the band. Dotted line 104 shows the limits of the desired 2:1 standing wave ratio. Figure 11 shows a practical form of an antenna using a two element matching section in which lengths of commercially available coaxial cable are used in the matching section.

Since the external parts of the antenna are generally similar to corresponding parts of Figure 6, they have been given the same reference numerals and will not again be described.

The modifications of this embodiment are in greater part contained within the vertical mast 21 wherein the conductor 31 to which the horizontal portion 32 is attached is split into two branches 132 and 133. To conductor branch 132 is connected a length of coaxial cable 134 acting as a series matching section. Cable 134 is composed of an inner conductor 144 and an outer sheath 146 maintained in coaxial relationship with respect to inner conductor 144 by a suitable dielectric. To the lower end of cable 134 is connected the conventional transmission line connector 40.

Branch 133 is connected to a second section of coaxial transmission line 135 of such characteristic impedance and of such length as to act as a shunt matching impedance. Coaxial transmission line cable 135, similar to 134, has an inner conductor 145 and an outer sheath 147. In one embodiment of this form of the present invention wherein the antenna had a vertical extension of three feet and the horizontal portion, of forty mil wire, was four and one-half feet long the matching structure was designed to match the antenna to a fifty ohm line over a frequency band including from thirty-six to forty-eight megacycles. Line section 134 was a length of seventy ohm solid dielectric coaxial transmission line. The length was about 72 electrical degrees at thirty-eight megacycles, and line section 135 was a half wavelength of section line of sixty-two ohm impedance. The remote end was left electrically open and the free length, external to mast 21, was arranged to be coiled up and supported out of the way. The upper ends of sheaths 146 and 147 are connected to the top end of mast 21 as by soldering them thereto as indicated at 150. Their adjacent top ends are thus connected in parallel relationship to the feed end of antenna wire 32'.

Figure 12:
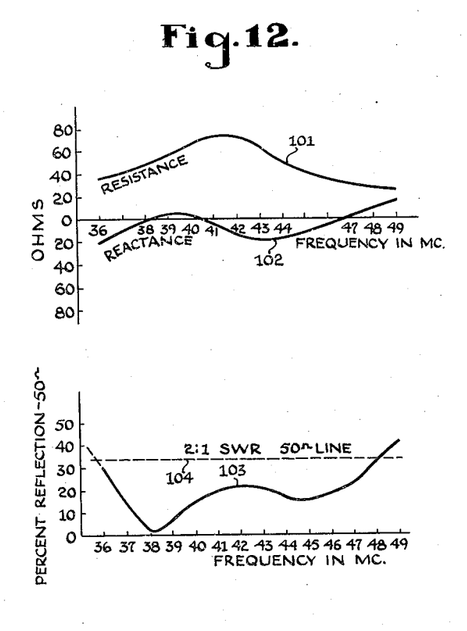
Figure 12 is a group of curves illustrating the effects of changing frequency on the antenna of Figure 11.

The characteristics of this antenna are shown in Figure 12 which corresponds in arrangement and identification of the curves with the showing of Figure 10.

The improvement in matching will be readily apparent by an inspection of correspondingly numbered curves.

While I have illustrated a particular embodiment of the present invention, it should be clearly understood that it is not limited thereto since many modifications may be made in the several elements employed and in their arrangement, and it is therefore contemplated by the appended claims to cover any such modifications as fall within the spirit and scope of the invention.

What is claimed is:

1. An inverted-L antenna having an over-all length of the order of one-quarter of the operating wavelength, the vertical portion of said antenna including an outer shell surrounding an inner conductor, said inner conductor being extended to form the horizontal portion of said antenna, and transducer means coupled to the lower end of the vertical portion of said antenna.

2. An inverted-L antenna having an over-all length of the order of one-quarter of the operating wavelength, the vertical portion of said antenna including an outer shell surrounding an inner conductor, said inner conductor being extended to form the horizontal portion of said antenna, and means for coupling a transmission line to said shell and said inner conductor at the lower end thereof.

3. An inverted-L antenna having an over-all length of the order of one-quarter of the operating wavelength, the vertical portion of said antenna including an outer shell surrounding an inner conductor, said inner conductor being extended to form the horizontal portion of said antenna, and means for coupling a transmission line to said shell and said inner conductor at the lower end thereof, the dimensions of said antenna being so chosen as to give an impedance equal to the product of the characteristic impedance of said transmission line and the maximum predetermined standing wave ratio.

4. An inverted-L antenna having an over-all length of the order of one-quarter of the operating wavelength, the vertical portion of said antenna including an outer shell surrounding an inner conductor, said inner conductor being extended to form the horizontal portion of said antenna, the lower end of said vertical portion being connected to a conductive sheet serving as a ground plane, and transducer means coupled to the lower end of the vertical portion of said antenna.

5. An inverted-L antenna having an over-all length of the order of one-quarter of the operating wavelength, the vertical portion of said antenna including an outer shell surrounding an inner conductor, said inner conductor being extended to form the horizontal portion of said antenna, the lower end of said vertical portion being connected to a conductive sheet serving as a ground plane, and means for coupling a transmission line to said shell and said inner conductor at the lower end thereof.

6. An inverted-L antenna having an over-all length of the order of one-quarter of the operating wavelength, the vertical portion of said antenna having a length of the order of one-eighth of the operating wavelength, and including an outer shell surrounding an inner conductor, said inner conductor being extended to form the horizontal portion of said antenna, and means for coupling a transmission line to said shell and said inner conductor at the lower end thereof.

7. An inverted-L antenna having an over-all length of the order of one-quarter of the operating wavelength, the vertical portion of said antenna having a length of the order of one-eighth of the operating wavelength, and including an outer shell surrounding an inner conductor, said inner conductor being extended to form the horizontal portion of said antenna, and means for coupling a transmission line to said shell and said inner conductor at the lower end thereof, a shunt impedance connected across the upper end of said vertical portion and said vertical portion serving as a series connected impedance matching section.

8. An inverted-L antenna having an over-all length of the order of one-quarter of the operating wavelength, the vertical portion of said antenna having a length of the order of one-eighth of the operating wavelength, and including an outer shell surrounding an inner conductor, said inner conductor being extended to form the horizontal portion of said antenna, and means for coupling a transmission line to said shell and said inner conductor at the lower end thereof, the horizontal portion of said antenna having a diameter of the order of one-tenth or less of the diameter of said outer shell.

9. An inverted-L antenna having an over-all length of the order of one-quarter of the operating wavelength, the vertical portion of said antenna having a length of the order of one-eighth of the operating wavelength, and including an outer shell surrounding an inner conductor, said inner conductor being extended to form the horizontal portion of said antenna, and means for coupling a transmission line to said shell and said inner conductor at the lower end thereof, the horizontal portion of said antenna having a diameter not greater than one-tenth of the diameter of said outer shell, the ratio of said diameters and the length of said vertical portion being so chosen as to give an impedance equal to the product of the characteristic impedance of said transmission line and the maximum predetermined standing wave ratio.

10. An inverted-L antenna having an over-all length of the order of one-quarter of the operating wavelength, the vertical portion of said antenna having a length of the order of one-eighth of the operating wavelength, and including an outer shell surrounding an inner conductor, said inner conductor being extended to form the horizontal portion of said antenna, and means for coupling a transmission line to said shell and said inner conductor at the lower end thereof, the horizontal portion of said antenna having a diameter not greater than of the order of one-tenth of the diameter of said outer shell, and tensioning means for supporting said horizontal portion in an extended position.

11. An inverted-L antenna having an over-all length of the order of one-quarter of the operating wavelength, the vertical portion of said antenna having a length of the order of one-eighth of the operating wavelength, and including an outer shell surrounding an inner conductor, said inner conductor being extended to form the horizontal portion of said antenna, and means for coupling a transmission line to said shell and said inner conductor at the lower end thereof, the horizontal portion of said antenna having a diameter of the order of one-tenth or less of the diameter of said outer shell, the space between said inner conductor and said outer shell being filled with an insulating material having such dielectric constant that the electrical length within said outer shell is of the order of one-quarter of the operating wavelength, and the ratio of the diameters of the outer shell and inner conductors being such as to match said antenna to said transmission line.

12. An inverted-L antenna having an over-all length of the order of one-quarter of the operating wavelength, the vertical portion of said antenna including an outer shell surrounding an inner conductor, said inner conductor being extended to form the horizontal portion of said antenna, the lower end of said vertical portion being connected to a conductive sheet serving as a ground plane, and transducer means coupled to the lower end of the vertical portion of said antenna, said vertical portion being slideably mounted in a collar in said conductive sheet whereby said antenna may be retracted.

13. An inverted-L antenna having an over-all length of the order of one-quarter of the operating wavelength and adapted for use on aircraft, the vertical portion of said antenna including an outer shell surrounding an inner conductor, said inner conductor being extended to form the horizontal portion of said antenna, the lower end of said vertical portion extending through a conductive sheet serving as the covering of the fuselage of said aircraft, means for coupling a transmission line to the lower end of the vertical portion of said antenna, said vertical portion being slideably mounted in a collar in said conductive sheet whereby said antenna may be retracted, and a guy wire connected between the free end of said horizontal portion and auxiliary supporting means so positioned that the length of said horizontal portion is parallel to the direction of flight of said aircraft and the tail structure of said aircraft.

14. An inverted-L antenna having an over-all length of the order of one-quarter of the operating wavelength and adapted for use on aircraft, the vertical portion of said antenna including an outer shell surrounding an inner conductor, said inner conductor being extended to form the horizontal portion of said antenna, the lower end of said vertical portion extending through a conductive sheet serving as the covering of the fuselage of said aircraft, means for coupling a transmission line to the lower end of the vertical portion of said antenna, said vertical portion being slideably mounted in a collar in said conductive sheet whereby said antenna may be retracted, and a guy wire connected between the free end of said horizontal portion and the tail structure of said aircraft.

15. An inverted-L antenna having an over-all length of one-quarter of the operating wavelength, the vertical portion of said antenna including an outer shell surrounding an inner conductor, said inner conductor being extended to form the horizontal portion of said antenna, the lower end of said vertical portion being connected to a conductive sheet serving as a ground plane, and means for coupling a transmission line to said shell and said inner conductor at the lower end thereof, said vertical portion being slideably mounted in a collar in said conductive sheet whereby said antenna may be retracted.

16. An inverted-L antenna having an over-all length of the order of one-quarter of the operating wavelength, the vertical portion of said antenna having a length of the order of one-eighth of the operating wavelength, and including an outer shell surrounding an inner conductor, said inner conductor being extended to form the horizontal portion of said antenna, and means for coupling a transmission line to said shell and said inner conductor at the lower end thereof, the horizontal portion of said antenna having a diameter of the order of one-tenth of the diameter of said outer shell, said vertical portion being slideably mounted in a collar in said conductive sheet whereby said antenna may be retracted.

17. An inverted-L antenna having an over-all length of the order of one-quarter of the operating wavelength, the vertical portion of said antenna having a length of the order of one-eighth of the operating wavelength, and including an outer shell surrounding an inner conductor, said inner conductor being extended to form the horizontal portion of said antenna, and means for coupling a transmission line to said shell and said inner conductor at the lower end thereof, the horizontal portion of said antenna having a diameter of the order of one-tenth of the diameter of said outer shell, the space between said inner conductor and said outer shell being filled with an insulating material having such dielectric constant that the electrical length within said outer shell is of the order of one-quarter of the operating wavelength, and the ratio of the diameters of the outer shell and inner conductors being such as to match said antenna to said transmission line, said vertical portion being slideably mounted in a collar in said conductive sheet whereby said antenna may be retracted.

18. A broad band inverted-L antenna having a vertical portion in the form of a hollow shell and a horizontal portion in the form of a wire, a pair of coaxial line sections within said hollow shell, each of said line sections including an inner conductor and an outer sheath, said outer sheaths being connected together and to said shell near the top of said shell, said inner conductors being connected to said horizontal portion, one of said line sections having a length of the order of one-half of a wave-length within said band and serving as a shunt matching impedance, the other of said sections having a length of the order of a quarter of a wavelength within said band and serving as a series matching impedance, and means for coupling a transmission line to the free end of said quarter wave line section.

19. A broad band inverted-L antenna having a vertical portion in the form of a hollow shell having a length less than one-eighth of wavelength within said band and a horizontal portion in the form of a wire having a length of the order of three-sixteenths of a wavelength at mid band, a pair of coaxial line sections within said hollow shell, each of said line sections including an inner conductor and an outer sheath, said outer sheaths being connected together and to said shell near the top of said shell, said inner conductors being connected to said horizontal portion, one of said line sections having a length of the order of one-half of a wavelength within said band and serving as a shunt matching impedance, the other of said sections having a length of the order of a quarter of a wavelength within said band and serving as a series matching impedance, and means for coupling a transmission line to the free end of said quarter wave line section.

ROBERT STEPHEN WEHNER.

REFERENCES CITED

The following references are of record in the file of this patent:

UNITED STATES PATENTS

| Number | Name | Date |
| --- | --- | --- |
| 2,239,724 | Lindenblad | Apr. 29, 1941 |
| 2,274,389 | Baeyer et al. | Feb. 24, 1942 |
| 2,267,951 | Roosenstein | Dec. 30, 1941 |
| 2,149,415 | Berndt | Mar. 7, 1931 |
| 2,156,661 | Wells | May 2, 1939 |